US011315362B2

(12) United States Patent
Lee et al.

(10) Patent No.: US 11,315,362 B2
(45) Date of Patent: Apr. 26, 2022

(54) EMOTION-RECOGNITION-BASED SERVICE PROVISION APPARATUS FOR VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Jin Mo Lee, Uiwang-si (KR); Young Bin Min, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/084,010

(22) Filed: Oct. 29, 2020

(65) Prior Publication Data

US 2022/0036048 A1 Feb. 3, 2022

(30) Foreign Application Priority Data

Jul. 29, 2020 (KR) .................. 10-2020-0094593

(51) Int. Cl.
  *G06V 40/16* (2022.01)
  *G06V 20/56* (2022.01)
  *G06V 20/59* (2022.01)

(52) U.S. Cl.
  CPC .......... *G06V 40/174* (2022.01); *G06V 20/56* (2022.01); *G06V 20/597* (2022.01)

(58) Field of Classification Search
  CPC .......... G06K 9/00302; G06K 9/00791; G06K 9/00845; G06V 40/174; G06V 20/56; G06V 20/597
  See application file for complete search history.

(56) References Cited

U.S. PATENT DOCUMENTS

| 10,187,690 B1* | 1/2019 | Garcia ............. H04N 21/44008 |
| 10,880,601 B1* | 12/2020 | Donahoe ............ H04N 21/4302 |
| 2015/0345981 A1* | 12/2015 | Goldman-Shenhar ...... G01C 21/3602 701/533 |
| 2016/0127641 A1* | 5/2016 | Gove ................. G06T 1/0007 348/143 |

(Continued)

FOREIGN PATENT DOCUMENTS

| JP | 6648304 B2 | 2/2020 |
| KR | 10-1901417 B1 | 9/2018 |

*Primary Examiner* — Ming Y Hon
(74) *Attorney, Agent, or Firm* — Morgan, Lewis & Bockius LLP

(57) ABSTRACT

A method of providing an emotion-recognition-based service for a vehicle includes monitoring an occupant and a driving situation, when recognizing an emotion of the occupant during the monitoring, comparing at least one of a first emotion as a type of a currently generated emotion or a first driving situation as a driving situation corresponding to a first time which is as a time at which the emotion is recognized, with at least one of a second emotion as a type of an emotion that is previously recognized compared with the emotion or a second driving situation as a driving situation corresponding to a second time which is as a time at which the previously generated emotion is recognized, and based on a result of the comparing, determining the currently generated emotion as one of a transient emotion, a sequential emotion, and a repetitive emotion.

17 Claims, 9 Drawing Sheets

(56) References Cited

U.S. PATENT DOCUMENTS

| | | | |
|---|---|---|---|
| 2016/0217321 A1* | 7/2016 | Gottlieb | G06K 9/00308 |
| 2017/0311863 A1* | 11/2017 | Matsunaga | A61B 5/163 |
| 2018/0050696 A1* | 2/2018 | Misu | A61B 5/7282 |
| 2018/0144185 A1* | 5/2018 | Yoo | G06K 9/00302 |
| 2018/0303397 A1* | 10/2018 | Krupat | A61B 5/0077 |
| 2019/0163965 A1* | 5/2019 | Yoo | G06K 9/629 |
| 2019/0276036 A1 | 9/2019 | Noguchi et al. | |
| 2020/0282980 A1* | 9/2020 | Kinoshita | B60W 40/04 |

* cited by examiner

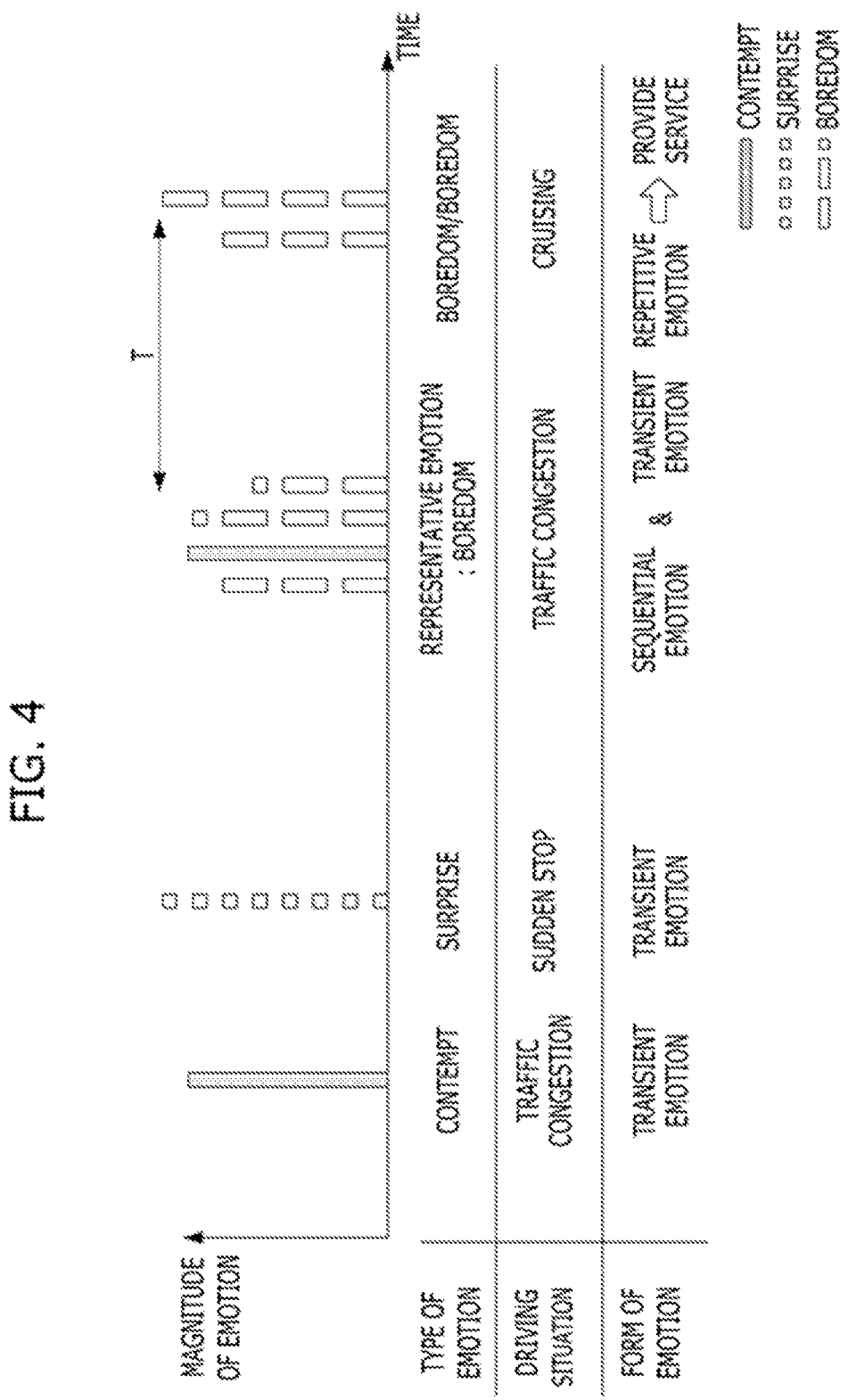

FIG. 5B
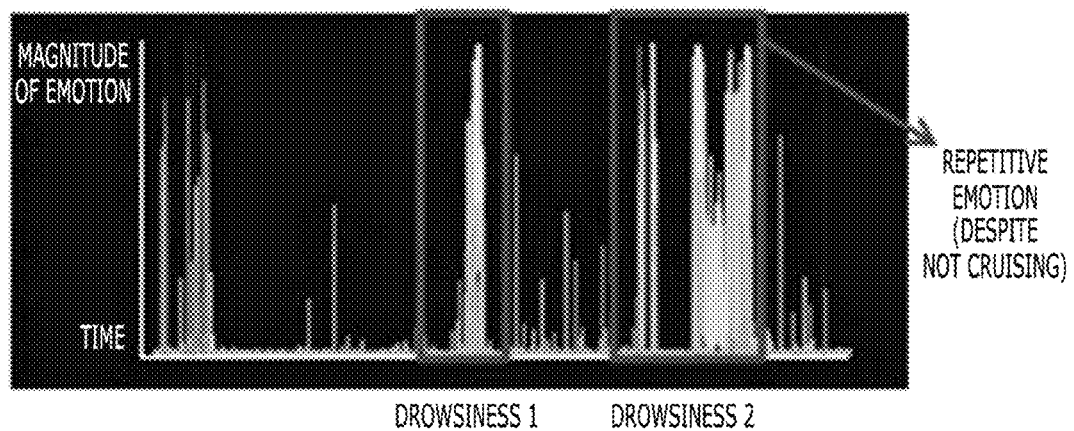
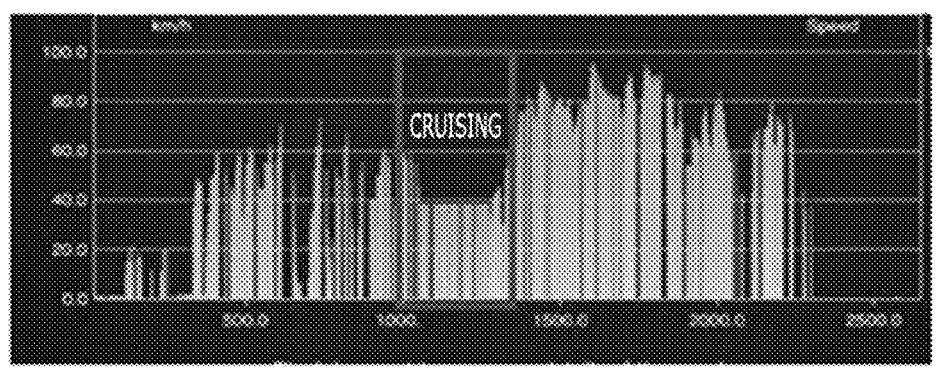

ved by a driver emotion, the service provision apparatus in the vehicle may be wastefully operated.

EMOTION-RECOGNITION-BASED SERVICE PROVISION APPARATUS FOR VEHICLE AND METHOD OF CONTROLLING THE SAME

This application claims the benefit of Korean Patent Application No. 10-2020-0094593, filed on Jul. 29, 2020, which is hereby incorporated by reference as if fully set forth herein.

TECHNICAL FIELD

The present disclosure relates to a method of controlling a vehicle function based on emotion recognition of a driver in the vehicle, and more particularly, to a method of providing an emotion-recognition-based service for a vehicle and a method of controlling the apparatus for determining whether to provide a service depending on a form of the emotion of the driver.

BACKGROUND

Recently, research has been actively conducted into technology for determining the emotional state of a user in a vehicle. In addition, research has also been actively conducted into technology for inducing a positive emotion of a user in a vehicle based on the determined emotional state of the user.

However, conventional emotion-recognition-based services determine only whether the emotional state of a user in a vehicle is positive or negative, and merely provides feedback for adjusting the output of components in the vehicle based on whether the determined emotional state is positive or negative.

However, a driver emotion may be rapidly restored to a neutral emotion after an emotion occurs while traveling, emotions may continuously change, and a specific emotion may repeatedly and frequently occur. Thus, when a service intends to be provided whenever an emotion is detected even if the current emotions correspond to a transient emotion in the interest of vehicle service provision, there is a problem in that the need for the service is low if a driver emotion is already restored to a neutral emotion at the time at which the service is to be provided.

SUMMARY

An object of the present disclosure is to provide an emotion-recognition-based service for a vehicle and a method of controlling the same for determining whether to provide a service by further considering the form of an emotion as well as a type of the emotion.

In particular, the present disclosure provides an emotion-recognition-based service for a vehicle and a method of controlling the same for effectively determining an emotion for which it is required to actually provide service depending on the form of the emotion.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of providing an emotion-recognition-based service for a vehicle is disclosed. The method includes monitoring an occupant and a driving situation, when recognizing an emotion of the occupant during the monitoring, comparing at least one of a first emotion as a type of a currently generated emotion or a first driving situation as a driving situation corresponding to a first time which is as a time at which the emotion is recognized, with at least one of a second emotion as a type of an emotion that previously occurs compared with the emotion or a second driving situation as a driving situation corresponding to a second time which is as a time at which the previously generated emotion is recognized, and based on a result of the comparing, determining the currently generated emotion as one of a transient emotion, a sequential emotion, and a repetitive emotion.

In another aspect of the present disclosure, an apparatus for providing an emotion-recognition-based service for a vehicle includes an emotion recognizer configured to determine an emotion of an occupant, a driving situation determiner configured to monitor a diving situation, and an emotion form determiner configured to, when the emotion recognizer recognizes the emotion of the occupant, compare at least one of a first emotion as a type of a currently generated emotion or a first driving situation as a driving situation corresponding to a first time which is as a time at which the emotion is recognized, with at least one of a second emotion as a type of an emotion that previously occurs compared with the emotion or a second driving situation as a driving situation corresponding to a second time which is as a time at which the previously generated emotion is recognized, and to determine the currently generated emotion as one of a transient emotion, a sequential emotion, and a repetitive emotion based on a result of the comparing.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4 is a diagram showing an example of determination of the form of an emotion according to an embodiment of the present disclosure;

FIGS. 5A to 5C show experimental examples of determination of an emotion form according to an embodiment of the present disclosure;

DETAILED DESCRIPTION

Figure 1:
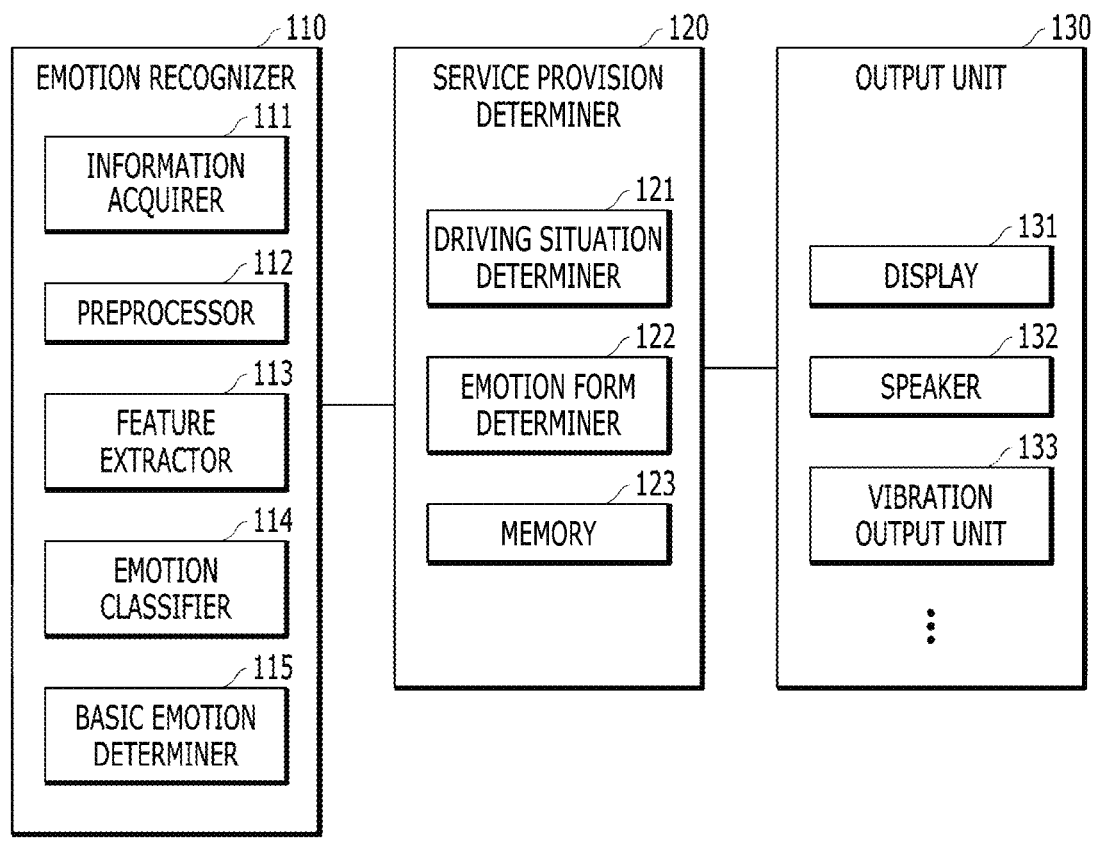
FIG. 1 is a diagram showing an example of an apparatus for providing an emotion-recognition-based service for a vehicle according to an embodiment of the present disclosure.

Exemplary embodiments of the present disclosure are described in detail with reference to the accompanying drawings so that those of ordinary skill in the art may easily implement the same. However, the present disclosure may be implemented in various different forms, and is not limited to these embodiments. To clearly describe the present disclosure, parts not concerning the description are omitted from the drawings, and like reference numerals denote like elements throughout the specification.

In addition, when a certain part "includes" a certain component, this indicates that the part may further include other components, rather than necessarily excluding such other components, unless there is no disclosure to the contrary. The same reference numbers will be used throughout the drawings and the specification to refer to the same parts.

An embodiment of the present disclosure may provide a service when a specific form of an emotion is recognized by further considering the form of the emotion as well as the type of an emotion in order to efficiently provide the service in response to an emotion of a vehicle occupant, e.g., a driver at a more significant time.

The form of the emotion to which embodiments of the present disclosure are applicable may include a transient emotion, a sequential emotion, and a repetitive emotion.

The sequential emotion may refer to the case in which a plurality of emotions simultaneously or sequentially occurs when one driving situation event sequentially occurs. An example in which various emotions sequentially occur may include the case in which a driver simultaneously or sequentially expresses emotions of laughing, sadness, and regret while conversing. In this case, processing in which an emotion change during a unit time is analyzed to determine that one emotion occurs while an event occurs may be appropriate for an actual driver emotion rather than processing in which emotions are determined to sequentially occur. If the sequential emotion is recognized and a related service is provided immediately when the emotion occurs, a user may be rather inconvenienced in that the service is provided while the emotion changes, and thus there is a need to provide the emotion recognition result and to execute the related service at the time at which the emotion is terminated with regard to the sequential emotion.

The repetitive emotion may refer to the case in which the same emotion occurs again at a small time interval. An example of the repetitive emotion may include the case in which a driver repeatedly feels bored or sleepy irrespective of a driving situation after the driver feels bored or sleepy due to continuous cruising and the case in which the driver becomes sensitive to movement of another vehicle irrespective of the driving situation after the driver is surprised by the sudden stop of a foregoing vehicle while traveling. A phenomenon in which an emotion that occurs once is repeatedly expressed even after the reason for the emotion does not exist any longer may be seen from research in the field of artificial emotion modeling, and a psychological phenomenon of existing research result in which memory about stimulation in the past is a source for stimulating a new emotion may be seen in a driving situation.

In addition, the transient emotion may refer to an individual emotion that does not correspond to emotions included in the repetitive emotion or the sequential emotion.

Hereinafter, an emotion-recognition-based service provision apparatus and a method of controlling the same according to an embodiment of the present disclosure will be described. In the following description, the target of emotion recognition is assumed to be the driver among vehicle occupants, but this is for convenience of description, and in reality, needless to say, it will be obvious to one of ordinary skill in the art to provide an emotion-based service for an arbitrary occupant as a target of emotion recognition, irrespective of the role of driving a vehicle, without exceeding the range that does not contradict the following description.

FIG. 1 is a diagram showing an example of an apparatus for providing an emotion-recognition-based service for a vehicle according to an embodiment of the present disclosure.

Referring to FIG. 1, the apparatus for providing an emotion-recognition-based service for a vehicle may include an emotion recognizer 110 for recognizing a driver emotion, a service provision determiner 120 for determining the form of an emotion based on the driver emotion recognized by the emotion recognizer 110, a driving situation, and a previous determination history, and determining whether to provide a service depending on the form of the emotion, and an output unit 130 for providing a service in a vehicle according to determination of the service provision determiner 120.

First, the emotion recognizer 110 may include an information acquirer 111, a preprocessor 112, a feature extractor 113, an emotion classifier 114, and a basic emotion determiner 115.

The information acquirer 111 may include a camera for acquiring an image containing at least the face of the driver. Depending on the emotion recognition method, the information acquirer 111 may further include a microphone for receiving a driver voice or a biosensor (e.g., a heart rate sensor) as well as the camera.

The preprocessor 112 may perform correction and noise removal on the information acquired by the information acquirer 111. For example, the preprocessor 112 may perform image-quality correction and noise removal on raw data of the image acquired through the camera through preprocessing.

The feature extractor 113 may perform feature extraction on a feature point as the basis of determination of an emotion, movement, etc. from the preprocessed image.

Technology for emotion feature extraction may broadly include three methods. One method is a holistic method of extracting a feature by modeling or expressing the intensity of pixel values in an image of the entire face. Another method is a geometrical method of extracting a feature by searching for the geometrical arrangement and position of features in the face. In addition, an active appearance model (AAM), which is formed by combining the holistic method and the geometrical method, may also be applied. One or more of these feature extraction methods may be implemented by the feature extractor 113.

However, these feature extraction methods are merely exemplary, and the present disclosure is not limited thereto, and thus the feature extraction method may be any method as long as the method is a method for extracting a feature for determining an emotion.

The emotion classifier 114 may classify an expression in a given image into emotional states based on classification of patterns of the extracted feature.

The emotion classifier 114 may classify emotions using various methods including a Bayesian network using a predefined conditional probability, a K-nearest neighbor algorithm, an artificial neural network, or the like.

The basic emotion determiner 115 may finally determine the classified emotional state as a preset type of basic emotion. Here, the basic emotion may include six emotions of misery, anger, happiness, disgust, sadness, and surprise that are classified based on the facial expression, which is proposed by P. Ekman. However, this is also merely exemplary, and the type and number of basic emotions may be set in different ways. For example, the basic emotion according to the present embodiment may further include drowsiness, contempt, boredom, or the like as well as the six basic emotions of P. Ekman.

The service provision determiner 120 may include a driving situation determiner 121, an emotion form determiner 122, and a memory 123.

The driving situation determiner 121 may determine the driving situation depending on the road or traffic situation and vehicle manipulation by a driver, such as driving in a congested section, cruising, making a sudden stop, or driving in a curved section. The driving situation determiner 121 may also determine a driver situation (e.g., making a telephone call or engaged in conversation with occupants) irrespective of the traffic situation or vehicle manipulation. To this end, the driving situation determiner 121 may acquire information required to determine the driving situation from various vehicle sensors (a vehicle speed sensor or an acceleration sensor), a navigation system for providing information on the road and a traffic volume, a head unit, or the like.

When the emotion recognizer 110 recognizes a basic emotion, the emotion form determiner 122 may determine whether the current recognized emotion corresponds to a transient emotion, a continuous emotion, or a repetitive emotion in consideration of at least one of the driving situation at the corresponding time, the previous emotion, the time at which a previous emotion was recognized, or the driving situation at the time of recognizing the previous emotion. The emotion form determiner 122 may determine whether to provide a service corresponding to an emotion included in the recognized emotion form or a representative emotion based on the emotion form.

The memory 123 may store the type and form of the recognized emotion, and the driving situation at the time at which the emotion is recognized whenever the emotion recognizer 110 recognizes an emotion.

When determining to provide the service corresponding to the emotion recognized by the service provision determiner 120, the output unit 130 may provide a corresponding form of service through a display 131 for providing a service through visual output, a speaker 132 for providing a service through audible output, a vibration output unit 133 for providing a service through vibration output, or the like.

For example, when a service corresponding to boredom is provided, the output unit 130 may output music having a fast tempo through the speaker 132. In another example, when a service corresponding to surprise is provided, the output unit 130 may provide an image for guidance of deep breathing through the display 131. Needless to say, the form in which service is provided is merely exemplary, and any service may be provided, as long as the service corresponds to the recognized emotion of the driver.

Hereinafter, a procedure of providing a service according to an embodiment will be described based on the aforementioned configuration of the apparatus.

Figure 2:
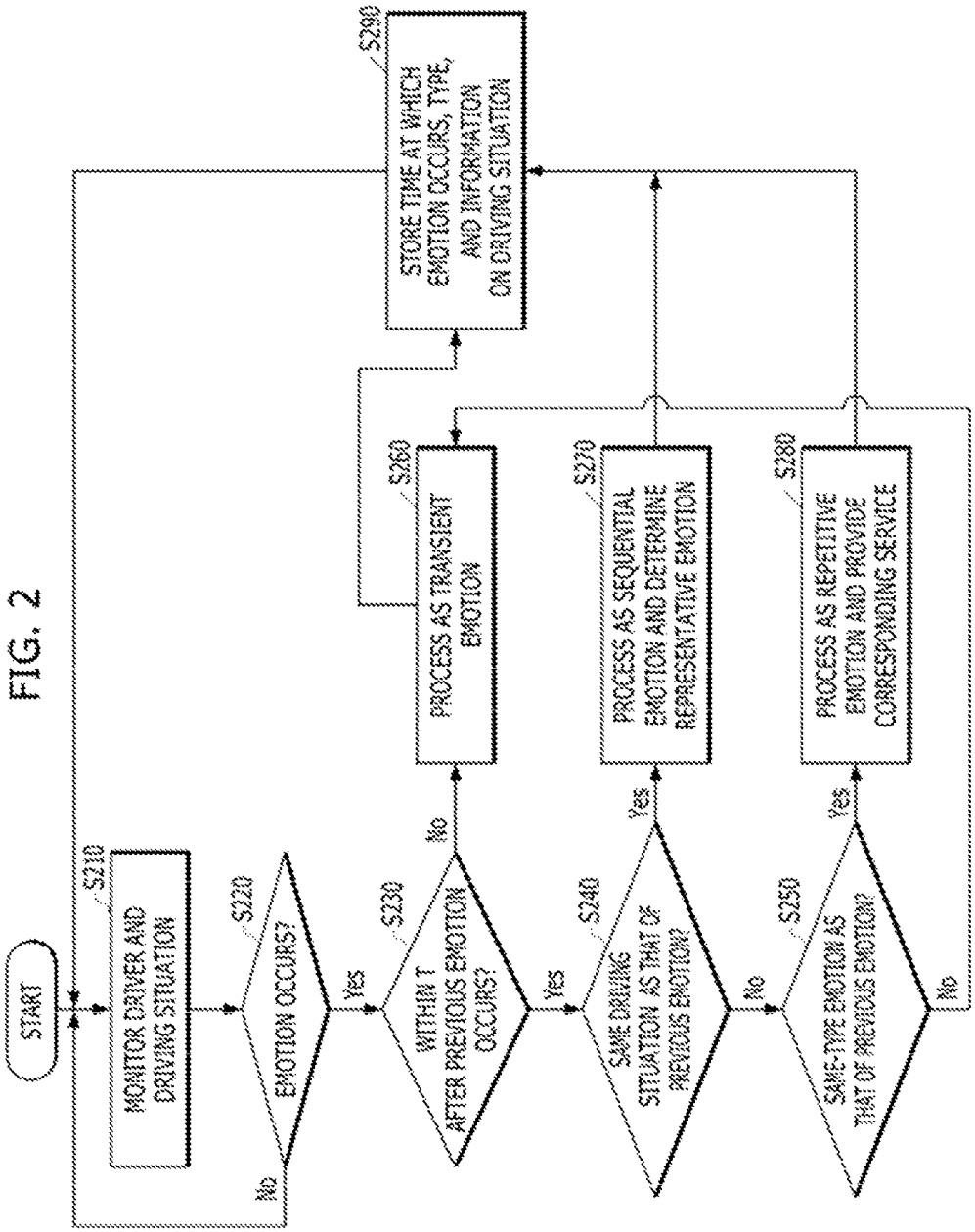
FIG. 2 is a flowchart showing an example of a procedure of providing an emotion-recognition-based service according to an embodiment of the present disclosure.

FIG. 2 is a flowchart showing an example of a procedure of providing an emotion-recognition-based service according to an embodiment of the present disclosure.

Referring to FIG. 2, first, a driver and a driving situation may be monitored (S210). For example, an image containing the face of the driver may be captured, a driver emotion may be determined based on the image captured by the emotion recognizer 110, and the driving situation determiner 121 may monitor a driving situation.

When the emotion recognizer 110 determines that an emotion occurs while the driving situation is monitored (YES of S220), the emotion form determiner 122 may search the memory 123 and may determine whether the current emotion occurs within a preset time T after the previous emotion occurs (S230).

When the previous emotion occurs after the preset time T (NO of S230), the emotion form determiner 122 may determine the form of the current emotion as a transient emotion (S260), and may store the time at which the current emotion occurs, the type thereof (i.e., the type of the basic emotion), and information on the driving situation at the corresponding time in the memory 123 (S290).

In contrast, when the previous emotion occurs within the preset time T (YES of S230), the emotion form determiner 122 may determine whether the driving situation when the current emotion occurs is the same as a driving situation when the previous emotion occurs (S240).

As the determination result, when the current emotion occurs in the same driving situation within a preset time from the time at which the previous emotion occurs, the emotion form determiner 122 may determine that the previous emotion and the current emotion are included in the sequential emotion and may determine a representative emotion of the sequential emotion (S270). For example, the emotion form determiner 122 may generate one type of representative emotion by combining information on the previous emotion and information on the new emotion. The representative emotion may be determined as emotion that occurs the most frequently among a plurality of emotions included in the sequential emotion, a positive emotion may be determined as the representative emotion in the case in which the emotions have the same frequency, or the representative emotion may be determined according to a preset priority of preset representative emotions, but the present disclosure is not limited thereto. For example, candidate representative emotions may be primarily determined based on the frequency at which an emotion occurs, a representative emotion may be determined by preliminary applying magnitude of emotions for the respective candidate representative emotions to determine the average magnitude of the emotions, and weights may also be applied to different emotions for respective driving situations.

When determining that the current emotion is a continuous emotion, the emotion form determiner 122 may store the time at which the representative emotion occurs, the type of the representative emotion, and information on the driving situation at the time in the memory 123 (S290).

When the current emotion occurs within a preset time from the time at which the previous emotion occurs but driving situations are different, the emotion form determiner 122 may determine whether the previous emotion and the current emotion are the same-type emotions (S250).

When the previous emotion and the current emotion are determined to be the same-type emotions (YES of S250), the emotion form determiner 122 may determine the current emotion as the repetitive emotion and may provide a service corresponding to the type of the current emotion through the output unit 130 (S280). Needless to say, in the case of the repetitive emotion, information on the time at which the current emotion occurs, the type of the current emotion, and the driving situation at the corresponding time may be stored in the memory 123 (S290).

In contrast, when the current emotion is an emotion that occurs within a predetermined time after the previous emotion occurs or when both the driving situation and the type of the current emotion are different from those of the previous emotion (NO of S250), the current emotion may be processed as the transient emotion (S260), and related information may be stored in the memory 123 (S290).

Hereinafter, a method of determining the form of an emotion will be described in more detail with reference to FIGS. 3 to 5C.

Figure 3:
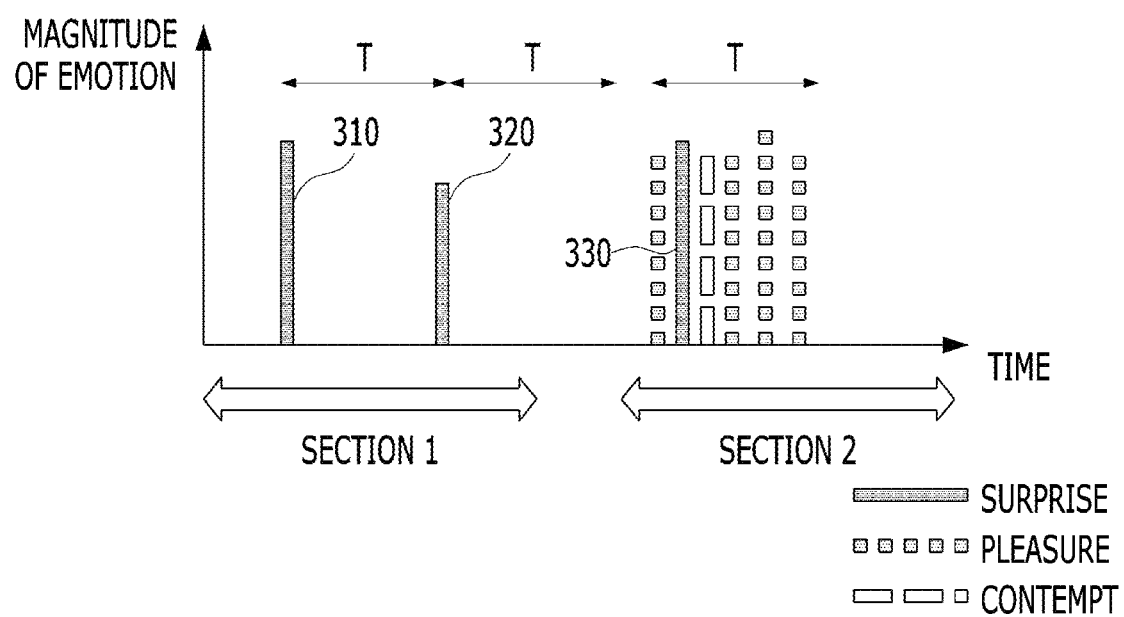
FIG. 3 is a diagram for explaining a reference for determining the form of an emotion according to an embodiment of the present disclosure.

FIG. 3 is a diagram for explaining a reference for determining the form of an emotion according to an embodiment of the present disclosure. In FIG. 3, the horizontal axis indicates a time that elapses after a vehicle stars travelling, and the vertical axis indicates the magnitude of an emotion.

FIG. 3 shows an example in which a driver is sensitive to a driving situation and repeatedly feels a surprise after a surprise occurs due to a sudden stop of a vehicle, etc. in a section 1. A surprise 310 that occurs first may be processed as an emotion that occurs transiently, but a surprise 320 that occurs again within a preset threshold time T is the same emotion as the surprise 310 in a different driving situation, and accordingly, the surprise 310 and the surprise 320 may be processed as a repetitive emotion, and the vehicle may provide a service corresponding to the emotion and perform vehicle control at the time at which the emotion is repeatedly recognized.

The drawing shows an example in which various emotions continuously occur within the threshold time T in the situation of conversation between a driver and an occupant in a section 2. In this case, all emotion changes in a driving situation in which conversation between the driver and the occupant continues may be integrated and processed as one emotion change. In the section 2, the frequency at which the emotion of pleasure occurs is the highest, and thus emotion changes may be processed as a single occurrence of pleasure as a representative emotion.

In the section 2, surprise 330 occurs, but occurs after the threshold time T elapses compared with the surprise 320 that occurs last, and thus the surprise 330 may not be processed as the repetitive emotion even if driving situations are different from each other.

FIG. 4 is a diagram showing an example of determination of the form of an emotion according to an embodiment of the present disclosure.

Similarly to FIG. 3, in FIG. 4, the vertical axis indicates the magnitude of an emotion and the horizontal axis indicates a time that elapses after a vehicle starts travelling. However, compared with FIG. 3, in FIG. 4, a driving situation and an emotion form are further illustrated below the graph.

Referring to FIG. 4, even if contempt and surprise, which correspond to transient emotions, are recognized while traveling, vehicle control and service provision may not be performed.

In contrast, in the graph, when boredom (which is a representative emotion of the sequential emotion) is recognized and boredom is recognized again within a threshold time T, this may be processed as a repetitive emotion, and service provision may be performed. In this case, the provided service may be recommendation and playback of music in order to overcome boredom because a driver feels boredom once in traffic congestion and then a driver repeatedly feels boredom during cruising after the traffic congestion, but the present disclosure is not limited thereto.

Figure 5A:
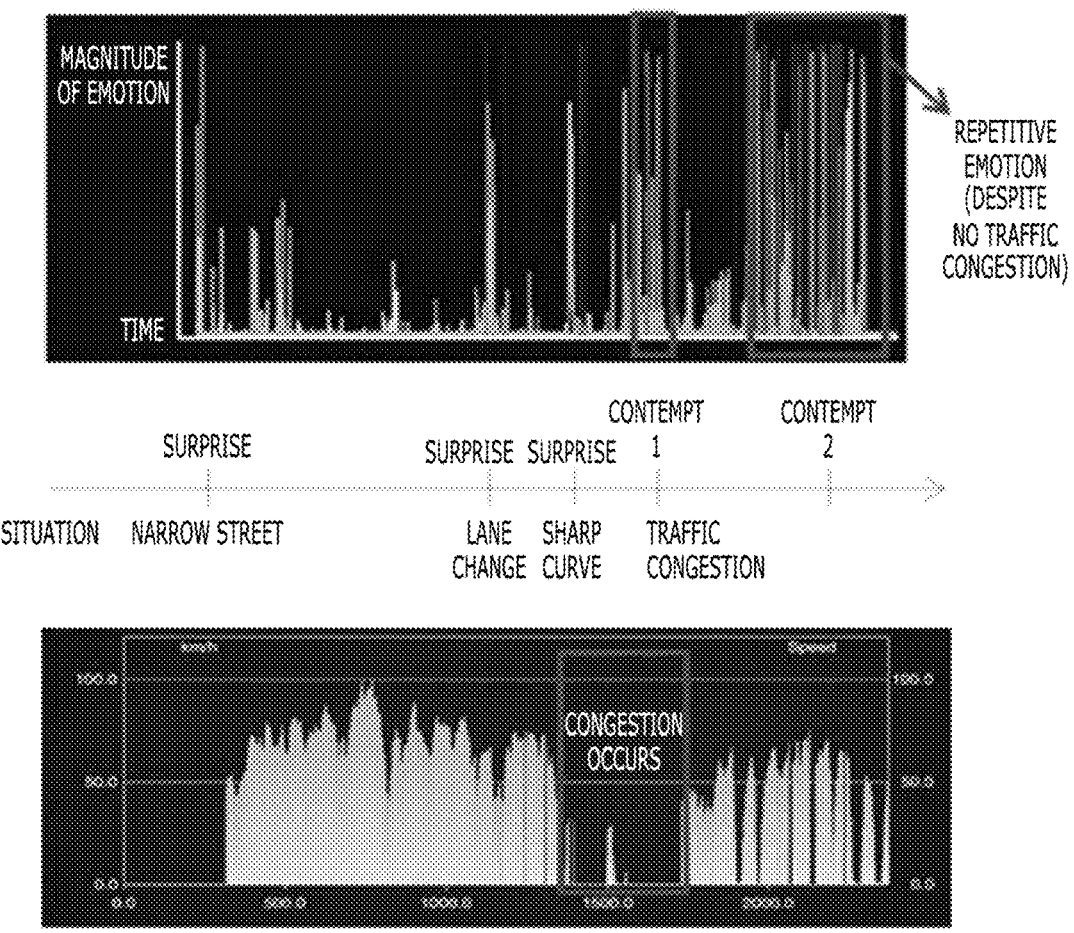
Figure 5C:
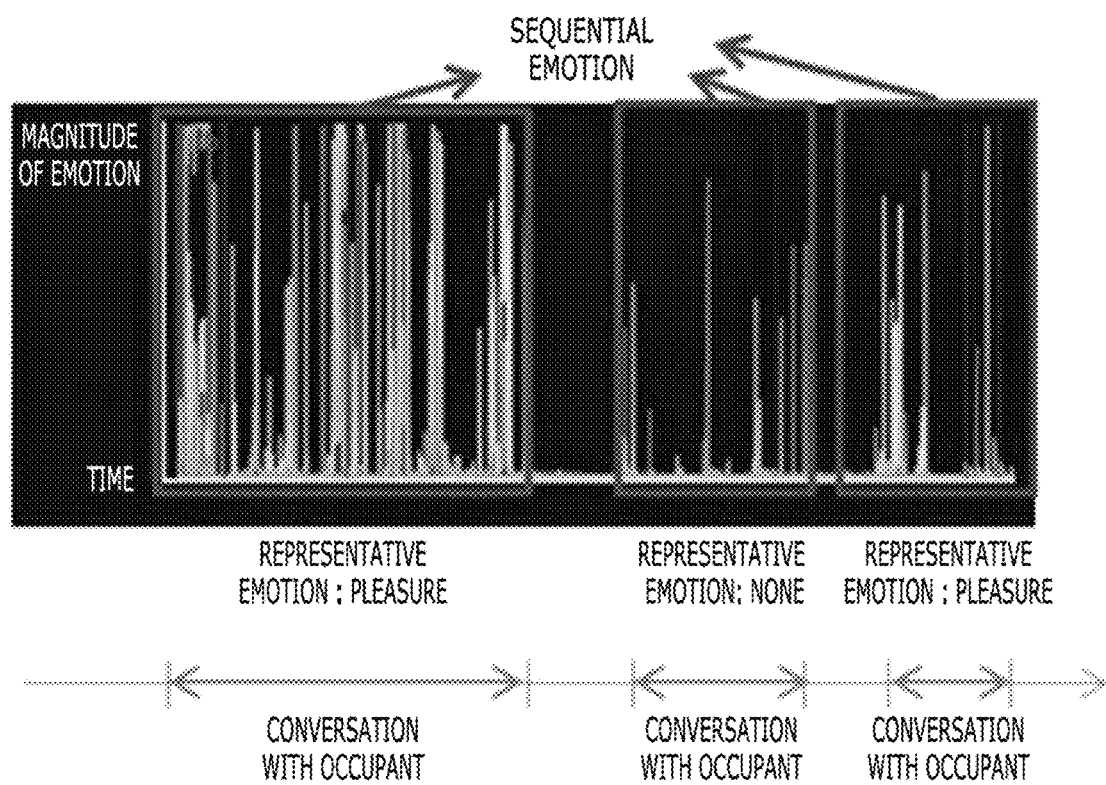

FIGS. 5A to 5C show experimental examples of determination of an emotion form according to an embodiment of the present disclosure.

First, referring to FIG. 5A, traffic congestion occurs, and a driver experiences contempt (contempt 1), and then repetitive contempt (contempt 2) is detected even in a situation in which the traffic congestion does not exist. When the contempt 1 and the contempt 2 occur within a threshold time, the contempt may be processed as a repetitive emotion, and service corresponding to contempt may be provided.

Referring to FIG. 5B, when the driver feels drowsiness (drowsiness 1) in a cruising situation, and then repetitive drowsiness (drowsiness 2) is detected even in a situation that is not cruising within a threshold time, drowsiness may be processed as a repetitive emotion, and a service corresponding to drowsiness (e.g., opening of a window, an operation of air conditioning, or multimedia playback) may be provided.

Referring to FIG. 5C, when conversation between a driver and an occupant continues, an emotion change is detected to occur sequentially. In this case, it may be seen that a representative emotion of the sequential emotion is extracted and the sequential emotion is processed as one representative emotion.

According to another embodiment of the present disclosure, a threshold time for a time interval between the previous emotion and the current emotion for processing the sequential emotion and a threshold time for a time interval between the previous emotion and the current emotion for processing the repetitive emotion may be set differently from each other, which will be described with reference to FIGS. 6 and 7.

Figure 6:
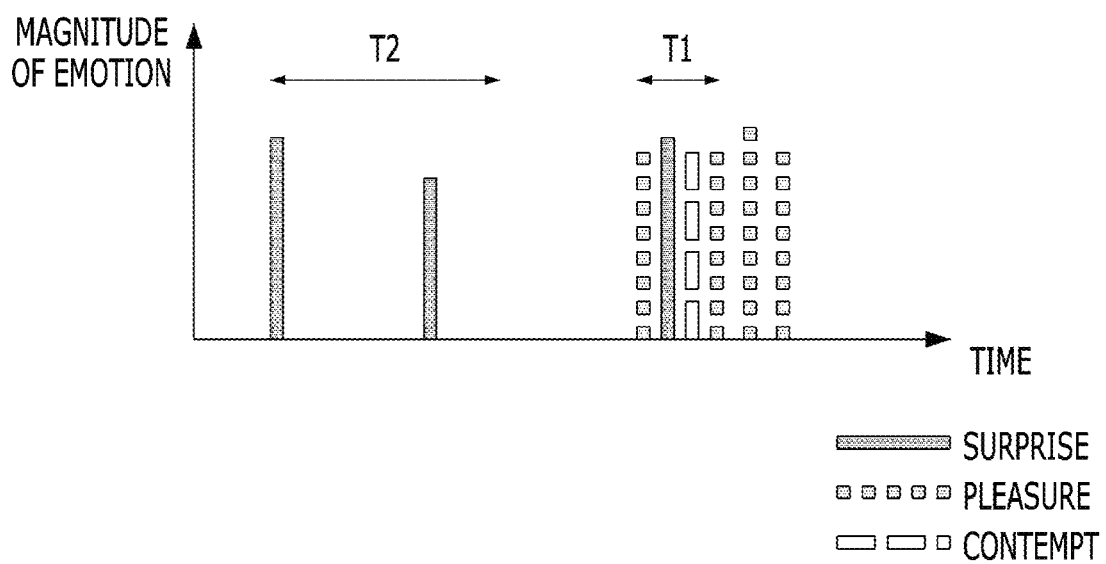
FIG. 6 is a diagram for explaining a reference for determining the form of an emotion according to another embodiment of the present disclosure.

FIG. 6 is a diagram for explaining a reference for determining the form of an emotion according to another embodiment of the present disclosure.

Referring to FIG. 6, a first threshold time T1, which is a time difference between a previous emotion and a current emotion for processing the continuous emotion, may be set differently from a second threshold time T2, which is a time difference between a previous emotion and a current emotion for processing the repetitive emotion.

Here, the first threshold time may be set to be shorter than the second threshold time. This is because the sequential emotion generally occurs within a short time but the repetitive emotion occurs at a long time interval compared with the sequential emotion. As such, when T1 and T2 are set differently, the procedure of providing the emotion-recognition-based service described above with reference to FIG. 2 may be modified as shown in FIG. 7.

Figure 7:
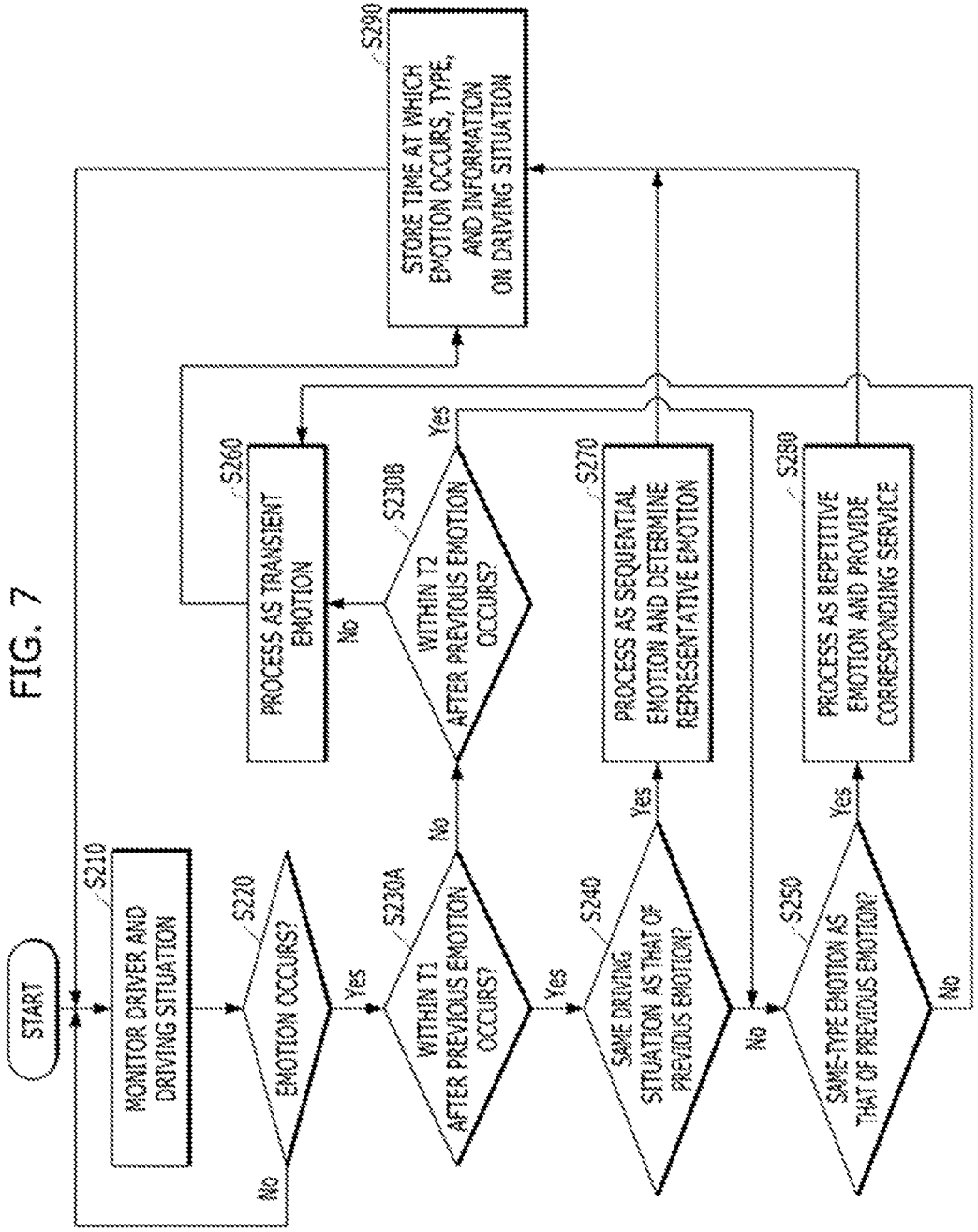
FIG. 7 is a flowchart showing an example of a procedure of providing an emotion-recognition-based service according to another embodiment of the present disclosure.

FIG. 7 is a flowchart showing an example of a procedure of providing an emotion-recognition-based service according to another embodiment of the present disclosure.

FIG. 7 is different from FIG. 2 in that operation S230 of FIG. 2 is divided into operations S230A and S230B in FIG. 7. FIG. 7 is similar to FIG. 2 except for this difference, and thus will be described in terms of this difference.

Referring to FIG. 7, when an emotion occurs (YES of S220) while a driver and a driving situation are monitored (S210), whether the current emotion occurs within T1 after the previous emotion occurs may be determined (S230A). When the current emotion occurs within T1 (YES of S230A), whether the driving situation in which the current occurs is the same as that of the previous emotion may be determined (S240) as in FIG. 2.

In contrast, when the current emotion occurs after T1 elapses from the previous emotion (NO of S230A), the emotion form determiner 122 may determine whether the current emotion occurs within T2 from the previous emotion (S230B).

When the current emotion occurs within T2 (YES of S230B), the emotion form determiner 122 may determine whether the current emotion is the same as the previous emotion (S250), and when T2 elapses (NO of S230B), the emotion form determiner 122 may process the current emotion as a transient emotion (S260).

The remaining procedures are similar to those of FIG. 2, and thus a repeated description thereof will be omitted for clarity.

The apparatus for providing an emotion-recognition-based service for a vehicle related to at least one embodiment of the present disclosure as configured above may determine whether to provide a service by further considering the form of an emotion.

In particular, according to the present disclosure, the sequential emotion and the repetitive emotion may be differentiated depending on the form of an emotion, and a service corresponding thereto may be provided.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium such as a non-transitory computer readable recording medium. For example, the method or the operations performed by individual components such as the emotion recognizer 110 or sub-components thereof and the service provision determiner 120 or sub-components thereof can be embodied as computer readable code stored on a memory implemented by, for example, a computer readable recording medium such as a non-transitory computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The emotion recognizer 110 and the service provision determiner 120, each, or together, may be implemented as a computer, a processor, or a microprocessor. Alternatively, the preprocessor 112, the feature extractor 113, the emotion classifier 114, and the basic emotion determiner 115, the driving situation determiner 121, and the emotion form determiner 122, each, or together, may be implemented as a computer, a processor, or a microprocessor. When the computer, the processor, or the microprocessor reads and executes the computer readable code stored in the computer readable recording medium, the computer, the processor, or the microprocessor may be configured to perform the above-described operations/method.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method of providing an emotion-recognition-based service for a vehicle, the method comprising:
monitoring an occupant and a driving situation;
when recognizing an emotion of the occupant during the monitoring, comparing at least one of a first emotion as a type of a currently generated emotion or a first driving situation as a driving situation corresponding to a first time which is as a time at which the emotion is recognized, with at least one of a second emotion as a type of an emotion that is previously recognized compared with the emotion or a second driving situation as a driving situation corresponding to a second time which is as a time at which the previously generated emotion is recognized; and
based on a result of the comparing, determining the currently generated emotion as one of a transient emotion, a sequential emotion, and a repetitive emotion,
wherein the determining comprises:
determining whether the first time is within a threshold time from the second time,
when the first time is within the threshold time from the second time, comparing the first driving situation with the second driving situation.

2. The method of claim 1, further comprising: when the currently generated emotion is determined to be the repetitive emotion, providing a service corresponding to the first emotion.

3. The method of claim 1, further comprising: when the currently generated emotion is determined to be the sequential emotion, determining a representative emotion among a plurality of emotions comprising at least the first emotion and the second emotion and configuring the sequential emotion.

4. The method of claim 1, wherein the determining further comprises: when the first time occurs after the threshold time from the second time, determining the currently generated emotion as the transient emotion.

5. The method of claim 1, wherein the determining further comprises: when the first driving situation and the second driving situation are the same, determining the currently generated emotion as the sequential emotion.

6. The method of claim 1, wherein the determining further comprises: when the first driving situation and the second driving situation are different from each other, comparing the first emotion with the second emotion.

7. The method of claim 6, wherein the determining further comprises: when the first emotion and the second emotion are the same, determining the currently generated emotion as the repetitive emotion.

8. The method of claim 6, wherein the determining further comprises: when the first emotion and the second emotion are different from each other, determining the currently generated emotion as the transient emotion.

9. The method of claim 1, wherein the determining further comprises determining whether the first time is within a preset first threshold time from the second time.

10. The method of claim 9, wherein the determining further comprises: when the first time occurs after the threshold time from the second time, determining whether the first time is within a second threshold time longer than the first threshold time from the second time.

11. The method of claim 10, wherein the determining further comprises: when the first time occurs after the threshold time from the second time, determining the currently generated emotion as the transient emotion.

12. The method of claim 10, wherein the determining further comprising: when the first time is within the second threshold time from the second time, comparing the first emotion with the second emotion.

13. The method of claim 12, wherein the determining further comprises:
when the first emotion and the second emotion are the same, determining the currently generated emotion as the repetitive emotion; and
when the first emotion and the second emotion are different from each other, determining the currently generated emotion as the transient emotion.

14. The method of claim 9, wherein the determining further comprising: when the first time is within the first threshold time from the second time, comparing the first driving situation with the second driving situation.

15. The method of claim 14, wherein the determining further comprises:
when the first driving situation and the second driving situation are the same, determining the currently generated emotion as the sequential emotion; and
when the first driving situation and the second driving situation are different from each other, comparing the first emotion with the second emotion and determining that the currently generated emotion is the repetitive emotion or the transient emotion according to whether the first emotion and the second emotion are the same.

16. A non-transitory computer-readable recording medium having recorded thereon a program for executing the method of claim 1.

17. An apparatus for providing an emotion-recognition-based service for a vehicle, the apparatus comprising:
an emotion recognizer configured to determine an emotion of an occupant;
a driving situation determiner configured to monitor a diving situation; and
an emotion form determiner configured to, when the emotion recognizer recognizes the emotion of the occupant, compare at least one of a first emotion as a type of a currently generated emotion or a first driving situation as a driving situation corresponding to a first time which is as a time at which the emotion recognized, with at least one of a second emotion as a type of an emotion that is previously recognized compared with the emotion or a second driving situation as a driving situation corresponding to a second time which is as a time at which the previously generated emotion is recognized, and to determine the currently generated emotion as one of a transient emotion, a sequential emotion, and a repetitive emotion depending on a result of the comparing and to compare the first driving situation with the second driving situation when the first time is within a threshold time from the second time.

* * * * *